(12) United States Patent
Zona

(10) Patent No.: US 12,172,484 B2
(45) Date of Patent: Dec. 24, 2024

(54) VEHICLE HAVING DRIVING AND STEERING WHEELS CARRIED BY LEGS ARTICULATED TO THE VEHICLE STRUCTURE, WITH EACH LEG INCORPORATING A SYSTEM FOR DRIVING AND ORIENTING THE RESPECTIVE WHEEL

(71) Applicant: FIRST DESIGN 1 S.P.A., Turin (IT)

(72) Inventor: Mauro Zona, Turin (IT)

(73) Assignee: FIRST DESIGN 1 S.P.A., Turin (IT)

( * ) Notice: Subject to any disclaimer, the term of this patent is extended or adjusted under 35 U.S.C. 154(b) by 0 days.

(21) Appl. No.: 18/547,243

(22) PCT Filed: Mar. 14, 2022

(86) PCT No.: PCT/IB2022/052261
§ 371 (c)(1),
(2) Date: Aug. 21, 2023

(87) PCT Pub. No.: WO2022/195439
PCT Pub. Date: Sep. 22, 2022

(65) Prior Publication Data
US 2024/0131891 A1 Apr. 25, 2024
US 2024/0227484 A9 Jul. 11, 2024

(30) Foreign Application Priority Data

Mar. 15, 2021 (IT) .................. 102021000006014

(51) Int. Cl.
*B60G 17/015* (2006.01)
*B60G 3/14* (2006.01)
(Continued)

(52) U.S. Cl.
CPC ........... *B60G 17/016* (2013.01); *B60G 3/145* (2013.01); *B60G 7/001* (2013.01); *B60G 11/183* (2013.01);
(Continued)

(58) Field of Classification Search
CPC .............. B60G 17/016; B60G 17/0157; B60G 17/0152; B60G 17/015; B60G 17/0165;
(Continued)

(56) References Cited

U.S. PATENT DOCUMENTS

2005/0145428 A1* 7/2005 Chun ................. B60G 17/0157
180/209
2014/0262586 A1* 9/2014 Dada ....................... B60G 3/12
180/252
(Continued)

FOREIGN PATENT DOCUMENTS

CN 204774604 U * 11/2015
CN 111806553 A 10/2020
(Continued)

OTHER PUBLICATIONS

International Search Report and Written Opinion of International Application No. PCT/IB2022/052261 mailed on Jul. 13, 2022, 11 pages.

*Primary Examiner* — Keith J Frisby
(74) *Attorney, Agent, or Firm* — Heslin Rothenberg Farley & Mesiti P.C.; Victor A. Cardona, Esq.

(57) ABSTRACT

A vehicle has steering and drive wheels supported by legs articulated to the structure of the vehicle. Each leg is rotatably mounted on a main support around a transverse axis. The main support is rotatably mounted about the transverse axis on a base structure, which is connected to the structure of the vehicle. An actuator device is operatively interposed between the main support and the base support to (Continued)

Figure 1:
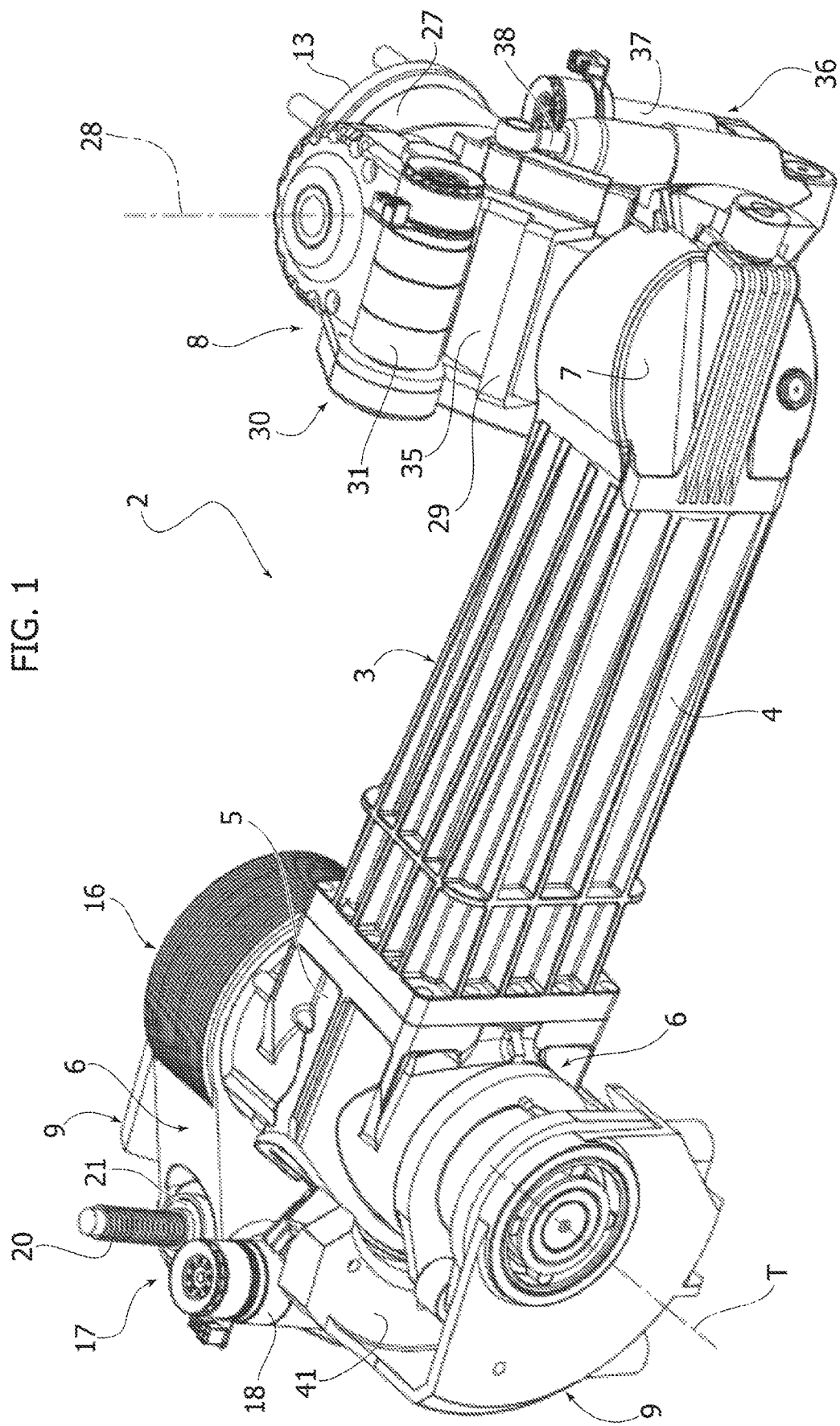

adjust the position of the main support around the transverse axis, and consequently the height of the vehicle from the ground. A hub-bearing support carrying the wheel hub is rotatably mounted around a wheel steering axis on an auxiliary camber adjustment support. The latter is carried around a camber adjustment axis on a further auxiliary caster adjustment support. The latter is carried by the leg around a caster adjustment axis. The steering of the wheel and the camber adjustment are controlled by respective actuator devices. The caster adjustment is automatically controlled as the position of the leg changes around the transverse axis.

12 Claims, 17 Drawing Sheets

(51) Int. Cl.
*B60G 7/00* (2006.01)
*B60G 11/18* (2006.01)
*B60G 17/016* (2006.01)
*B60G 17/0165* (2006.01)
*B60K 7/00* (2006.01)
*B60K 17/04* (2006.01)
*B62D 7/14* (2006.01)
*B62D 17/00* (2006.01)

(52) U.S. Cl.
CPC ..... *B60G 17/0152* (2013.01); *B60G 17/0157* (2013.01); *B60G 17/0165* (2013.01); *B60K 7/0007* (2013.01); *B60K 17/043* (2013.01); *B62D 7/14* (2013.01); *B62D 17/00* (2013.01); *B60G 2200/13* (2013.01); *B60G 2200/46* (2013.01); *B60G 2300/07* (2013.01); *B60G 2300/40* (2013.01); *B60G 2400/82* (2013.01); *B60G 2500/30* (2013.01); *B60G 2800/914* (2013.01)

(58) Field of Classification Search
CPC ...... B60G 7/001; B60G 7/00; B60G 2500/30; B60G 2200/46; B60G 2200/13; B60G 2300/07; B60G 2300/40; B60G 2400/82; B60G 3/145; B60G 3/14; B60G 11/183; B60G 2206/11; B60G 2206/0114; B60G 2800/914; B60K 7/0007; B60K 7/00; B60K 17/043; B60K 17/04; B62D 7/14; B62D 17/00
USPC ....................................................... 280/5.514
See application file for complete search history.

(56) References Cited

U.S. PATENT DOCUMENTS

| | | | |
|---|---|---|---|
| 2019/0241037 A1* | 8/2019 | Hays | B60B 19/00 |
| 2020/0009931 A1* | 1/2020 | Zona | B25J 9/0087 |
| 2020/0101809 A1* | 4/2020 | Bowden | B66F 11/044 |
| 2020/0140249 A1* | 5/2020 | Hackenberg | B66F 13/00 |
| 2020/0189376 A1* | 6/2020 | Crane | B60K 1/02 |
| 2020/0247230 A1 | 8/2020 | Tepedino et al. | |
| 2020/0316987 A1 | 10/2020 | Hsu | |
| 2021/0394575 A1* | 12/2021 | Nong | B60G 17/0162 |
| 2023/0322072 A1* | 10/2023 | Drach | B62D 61/12 |
| | | | 180/245 |

FOREIGN PATENT DOCUMENTS

| | | |
|---|---|---|
| DE | 102014112455 A1 * | 3/2016 |
| FR | 2893298 A1 | 5/2007 |
| WO | 2013130642 A1 | 9/2013 |
| WO | 2018172953 A1 | 9/2018 |

* cited by examiner

VEHICLE HAVING DRIVING AND STEERING WHEELS CARRIED BY LEGS ARTICULATED TO THE VEHICLE STRUCTURE, WITH EACH LEG INCORPORATING A SYSTEM FOR DRIVING AND ORIENTING THE RESPECTIVE WHEEL

CROSS REFERENCE TO RELATED APPLICATIONS

This application is a national stage filing under Section 371 of International Application No. PCT/IB2022/052261, filed Mar. 14, 2022, published in English on Sep. 22, 2022, as WO 2022/195439 and which claims priority from Italian Patent Application No. 102021000006014 filed on Mar. 15, 2021, the entire disclosures of which are incorporated herein by reference.

FIELD OF THE INVENTION

The present invention relates to a vehicle, comprising a vehicle structure and a plurality of wheels carried by respective legs articulated to the vehicle structure,
  wherein one or more of said articulated legs comprises a leg structure carrying an electric motor for driving a respective wheel, and a mechanical transmission operatively interposed between a shaft of said electric motor and a hub of said wheel,
  wherein said leg structure is pivotally mounted on a main support around an axis, which is transversal with respect to a longitudinal direction of the vehicle,
  wherein a spring element and a damper member are operatively interposed between said main support and the leg structure,
  wherein said main support is—in turn—rotatably mounted about said transverse axis on a base support, which is connected to the structure of the vehicle,
  wherein an actuator device is operatively interposed between the main support and the base support to adjust the position of the main support around said transverse axis with respect to the base structure, the rotation of the main support being transmitted to the leg structure by said spring element and/or by said damper member, which are interposed between the main support and the leg structure,
  in such a way that the activation of said actuator device adjusts the position of the leg with respect to the vehicle, and consequently the height of the vehicle from the ground, while for a given adjustment of the height of the vehicle, during running of the vehicle, the leg structure pivots around said transverse axis with respect to said main support, against the action of said spring element and said damper member.

PRIOR ART

A vehicle having the aforesaid characteristics has been described and illustrated by the same Applicant in WO 2018 172953 A1. The embodiment example illustrated in this document refers to a vehicle of a type particularly suitable for use on impervious terrain, for example, for civil protection operations. Some of the principles behind such a vehicle, however, are implementable to produce vehicles of any type, including small electric cars or higher class electric cars, as well as off-road vehicles.

However, in the case of some of these applications, and in particular in the case of application to an electric motor car, further improvements to the basic principles already proposed by the Applicant are required, in order to further increase the advantages thereof.

OBJECT OF THE INVENTION

Therefore, an object of the present invention is to improve the solution previously proposed.

Another object of the invention is that of producing—in particular—an articulated leg assembly for a vehicle of the type specified above, which has a series of additional and advantageous characteristics with respect to the previously proposed solution.

Another object of the invention is to propose—in particular—a new articulated leg configuration incorporating the electric motor for driving the wheel, which allows the control of both the steering of the wheel carried by the articulated leg—in a simple and efficient way—as well as the "camber", "caster" and "toe" angles of the wheel carried by the articulated leg.

Another object of the invention is to provide a spring element and a damper member to counteract the oscillation movements of the articulated leg during the running of the vehicle, produced with a simple configuration and of reduced bulk.

Another object of the invention is to provide an articulated leg assembly of the type indicated above wherein an adjustment oscillation of the articulated leg around a vertical axis, with respect to the vehicle structure, can be provided to obtain a wheel track variation of the vehicle.

Another object of the invention is to exploit the proposed solution to allow dynamic control of the vehicle while driving in order to ensure adequate road holding, high comfort for passengers and the possibility of dynamically adapting the height of the vehicle from the ground while driving, based on a predictive survey of the ground profile in front of the vehicle.

Another object of the invention is to provide a motor-vehicle that can be configured with a modular structure, wherein each articulated leg constitutes a module that performs both the traction function and the suspension function at the same time, with dynamic control of the torque applied to each wheel, the attitude imposed on each wheel and the height of the vehicle from the ground.

Still another object is to leave more space available for the passenger compartment and the boot and/or for impact absorbing structures, to the benefit of the safety of passengers.

Another object is to provide a vehicle having great flexibility of use, and suitable for use on the road and off-road, on any type of terrain.

Finally, an object of the invention is to allow each wheel to always be kept perpendicular to the ground, resulting in less wear of the tires.

SUMMARY OF THE INVENTION

In view of achieving one or more of the aforesaid objects, the invention relates to a vehicle having the characteristics disclosed at the beginning of the present description and further characterized in that:
  said leg structure comprises a support casing within which aforesaid electric motor is arranged, and which comprises:

a first end portion rotatably supported by the main support around the aforesaid transverse axis, and a second end portion carrying a wheel support unit, and wherein said wheel support unit includes:

a hub-bearing support, rotatably mounted around a steering axis that rotates on an auxiliary support for camber adjustment, which is in turn carried by the second end portion of the leg structure in a manner orientable around a camber adjustment axis, and a camber adjustment actuator device carried, directly or indirectly, by said second end portion of the leg structure.

According to an additional characteristic, the camber adjustment support is mounted so that it can be oriented around a camber adjustment axis on an auxiliary caster adjustment support, which is carried by said second end portion of the leg structure in an orientable manner around a caster adjustment axis. The caster adjustment auxiliary support carries the aforesaid camber adjustment actuator device and is connected to a caster control device configured to automatically adjust the position of the caster adjustment auxiliary support as the position of the leg structure varies around the aforesaid transverse articulation axis.

In the preferred embodiment, each of the aforesaid actuator devices for adjusting the height of the vehicle from the ground, for controlling steering of the wheel, and for camber adjustment, is an electrically-operated actuator device, and the vehicle comprises an electronic controller configured and programmed to control said actuator devices on the basis of signals coming from one or more sensors.

On the other hand, the caster control device may be of the passive type. In a first embodiment, it comprises a gear transmission that operatively connects a gear sector carried by the base support to a gear sector carried by the aforesaid auxiliary caster adjustment support. In a second solution, the caster control device is a pantograph system operationally interposed between the main support and the auxiliary caster adjustment support. In both solutions, when the leg structure pivots around its articulation axis, the aforesaid caster control device rotates the auxiliary caster adjustment support with respect to the leg structure, in such a way as to maintain the steering axis of the wheel parallel to itself. In one variant, the pantograph system may have a variable configuration by means of an electric actuator.

According to an additional characteristic of the invention, the electric motor is arranged with its axis parallel to the longitudinal direction of the leg structure, and has a shaft connected to the wheel hub by means of a transmission including:

a first rotatable shaft driven by an electric motor and rotatably mounted inside the leg structure around an axis arranged in the longitudinal direction of the leg structure, a pair of bevel gears, which connect in rotation the first shaft with a second shaft protruding from the second end portion of the leg structure, and at least one homokinetic joint to connect the second shaft to the wheel hub.

In the preferred embodiment, the aforesaid damping member is a rotational damper arranged with an axis coincident with the aforesaid transverse articulation axis, on one side of the leg structure and operatively interposed between the leg structure and the main support.

Again in the case of the preferred embodiment, the aforesaid spring member is a torsion bar arranged around an axis parallel and spaced apart from the aforesaid transverse articulation axis. The torsion bar has one end anchored to the base support, and the opposite end bearing a crank, which is connected by means of an articulated rod to an additional crank rotatable with the leg structure around the aforesaid transverse articulation axis.

In an additional embodiment, it can be envisaged that the aforesaid base support is—in turn—mounted articulated on the vehicle structure in a rotatable manner around a vertical axis, and that an actuator device is associated therewith to adjust the position of the base support, and consequently of the entire leg, around the aforesaid vertical axis, so as to adjust the wheel track of the vehicle.

According to that already proposed in WO 2018 172953 A1, the vehicle according to the invention may comprise one or more sensors configured to detect the profile of the ground in front of the vehicle while the vehicle is running, and the vehicle may be equipped with an electronic control unit configured to receive the output signals from said sensors and to control the actuator devices that control the position of the articulated legs around the respective articulation axes, as a function of said output signals.

In this way, the vehicle is able to "predict" the configuration of the ground on which it is moving and is able to automatically adapt the height of the vehicle from the ground according to the detected configuration. The control system may carry out this control operation also taking into account further parameters, such as vehicle speed.

Thanks to the characteristics indicated above, the articulated leg unit forming the subject of the present invention is able to achieve a series of important advantages.

Firstly, the articulated leg assembly incorporates the wheel traction and suspension functions in itself, which greatly simplifies the vehicle construction.

Furthermore, the articulated leg unit forming the subject of the present invention allows a dynamic electronic control of the wheel attitude (camber, caster and toe adjustment) in an extremely simple and precise manner.

Another advantage of the articulated leg assembly according to the invention resides in the fact that all the traction and suspension members are incorporated in an assembly with a relatively small footprint, which gives ample flexibility in designing the configuration of the vehicle, and—in particular—leaves more space available for the passenger compartment and boot and/or for impact absorbing structures, to the benefit of passenger safety.

The vehicle according to the invention also has a great flexibility of use as it is suitable for use on the road and off-road, on any type of terrain. The electronic control may be configured to always keep the wheel perpendicular to the ground, resulting in less tire wear.

Thanks to the characteristics indicated above, the invention allows its advantageous application on various types and classes of vehicle, which also gives important advantages from the point of view of rationalization of production.

It should be noted that in the present description and in the claims that follow the term "wheel" is used both to indicate the case of a simple wheel, and to indicate the case of an assembly of wheels carried by the same articulated leg, as well as the case of any other type of ground engaging member, such as a track.

DETAILED DESCRIPTION OF PREFERRED EMBODIMENTS

Figure 2:
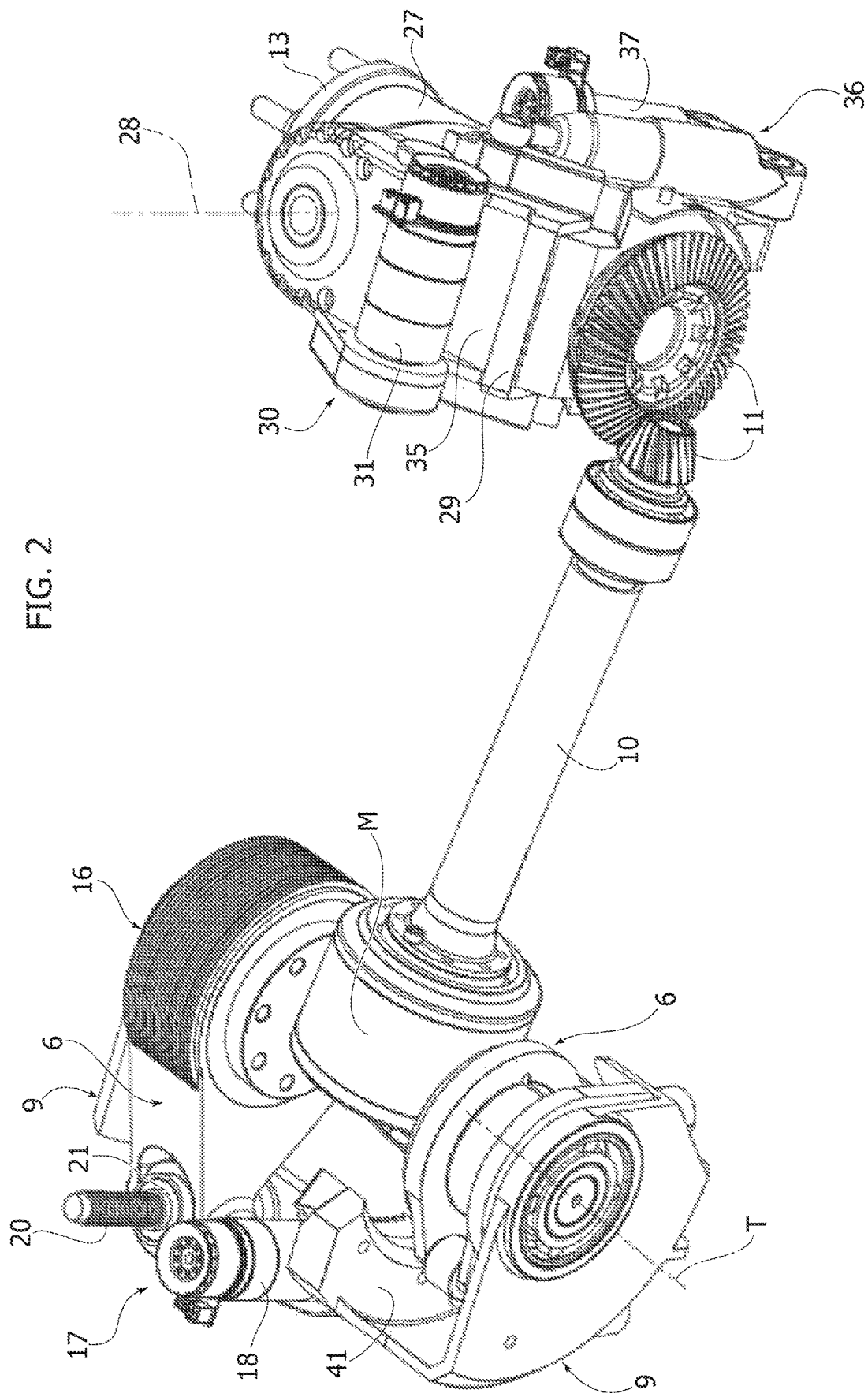
Figure 2A:
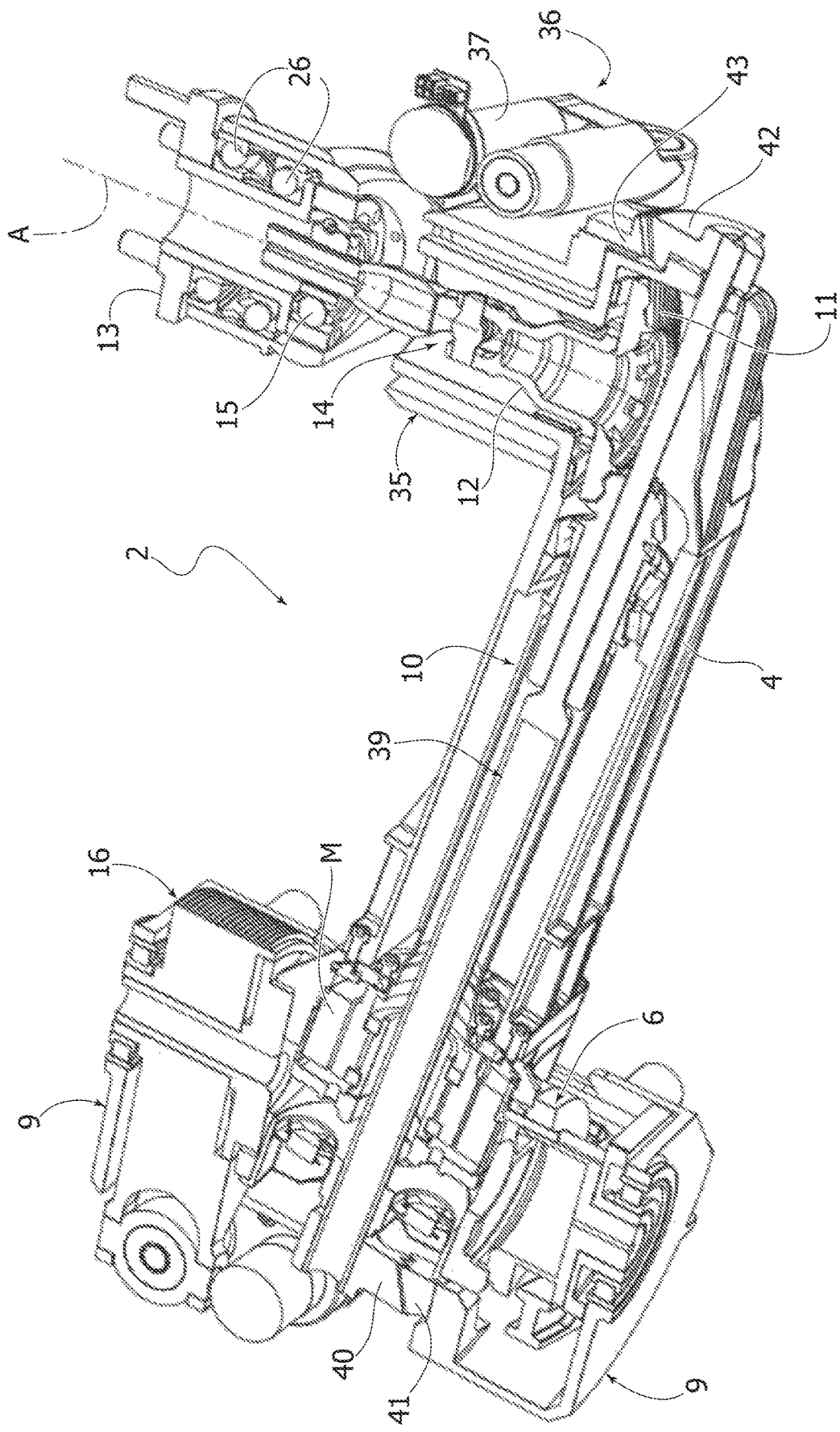
Figure 3:
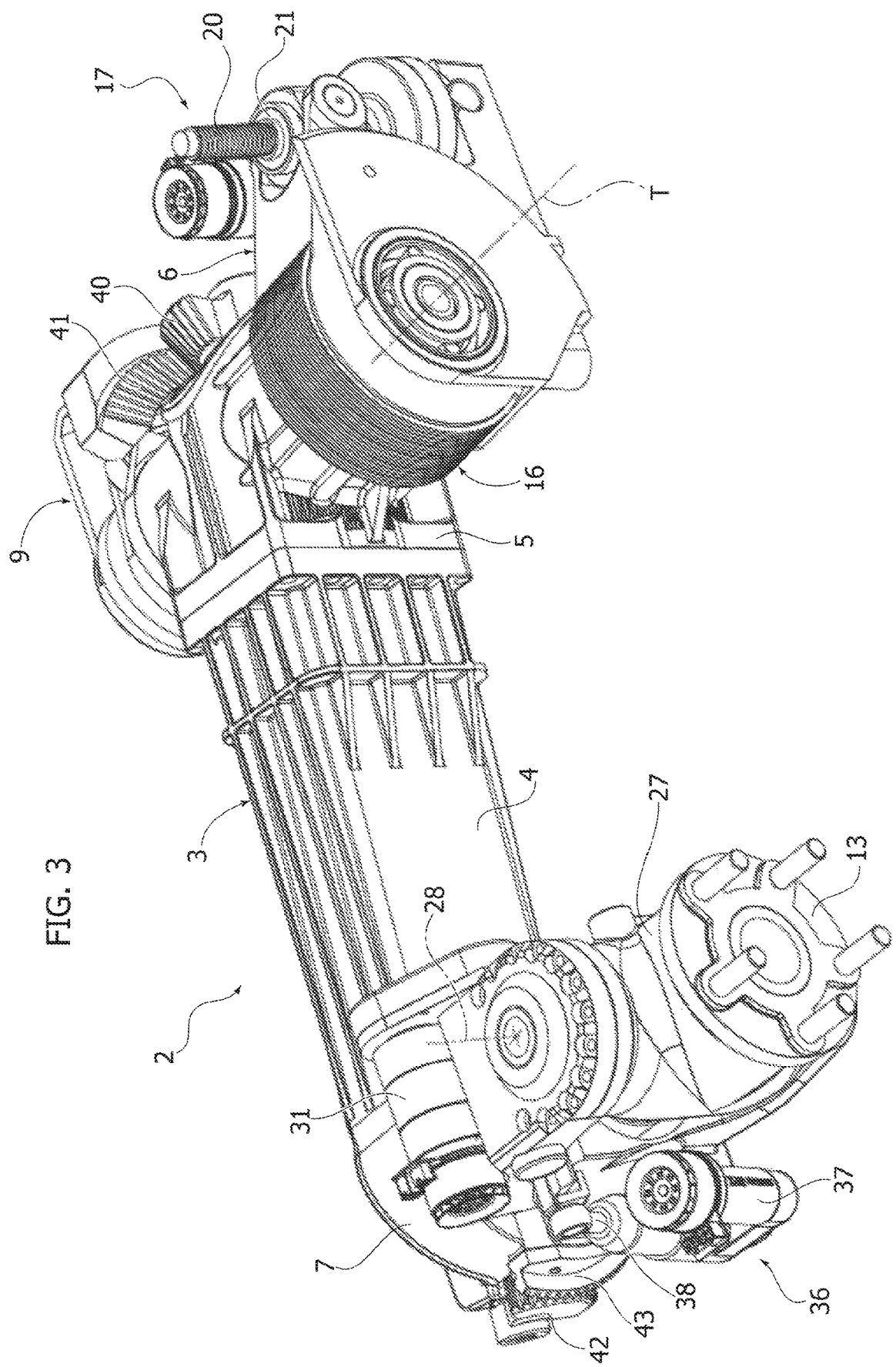
Figure 4:
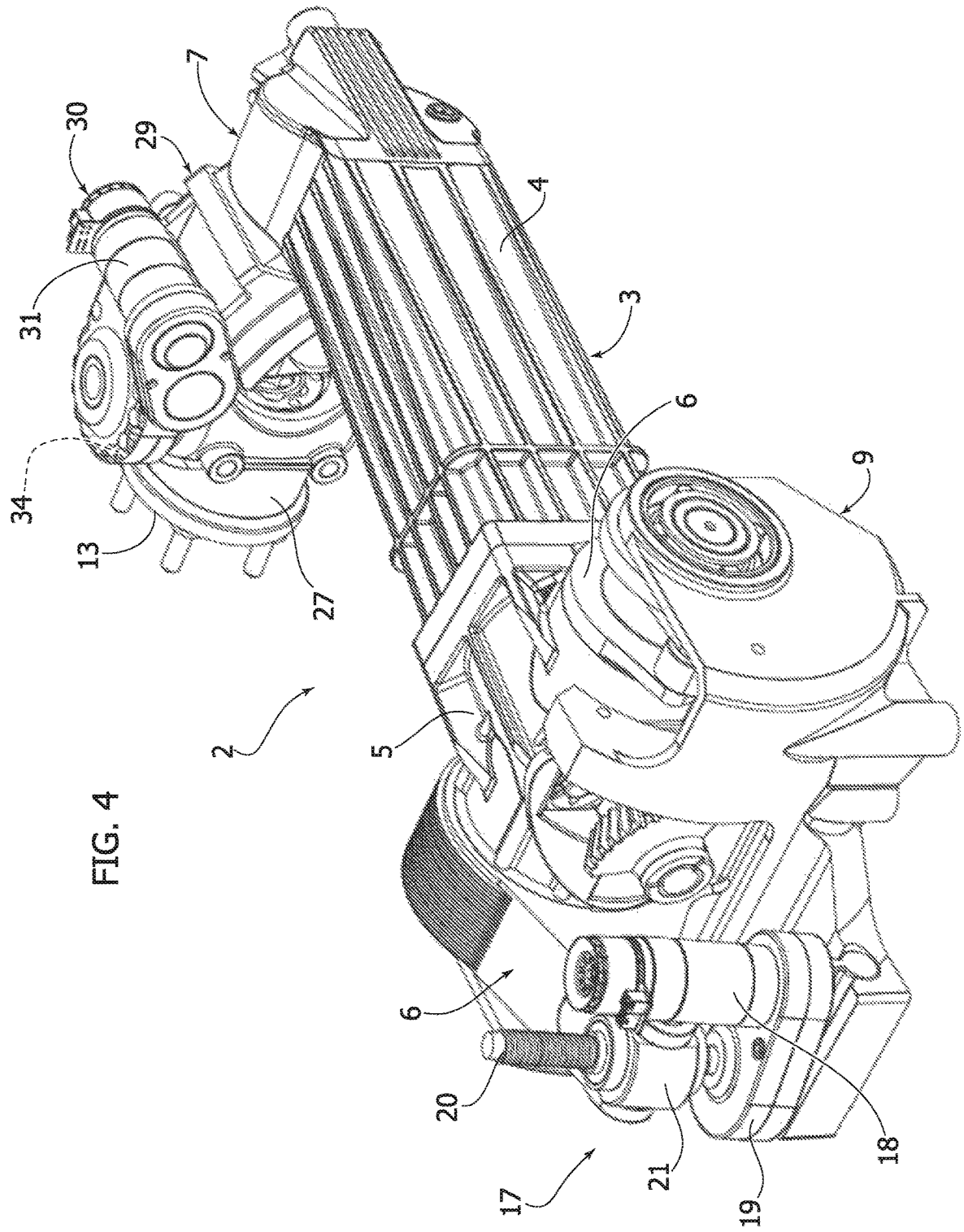
Figure 5:
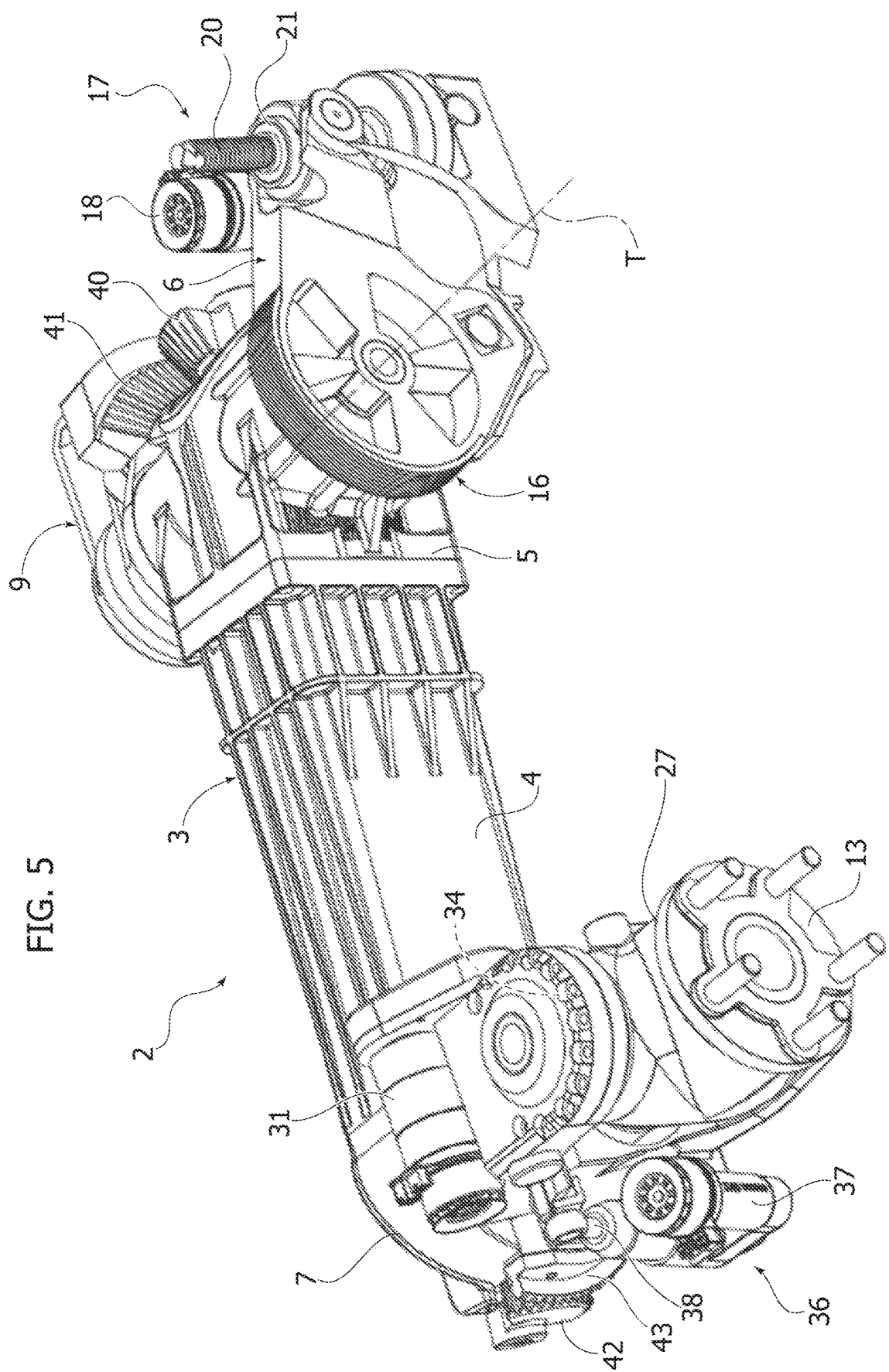
Figure 6:
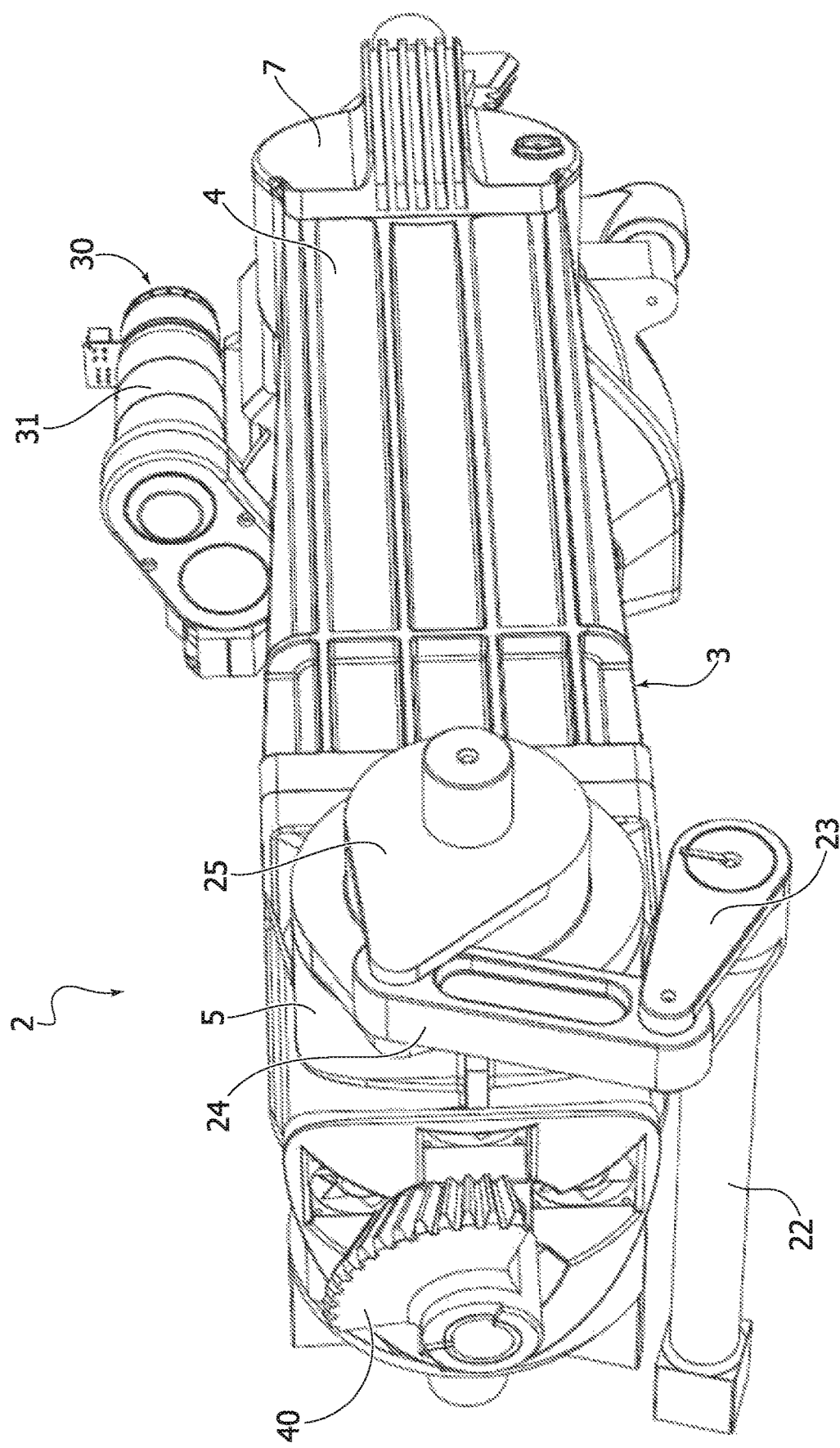
Figure 7:
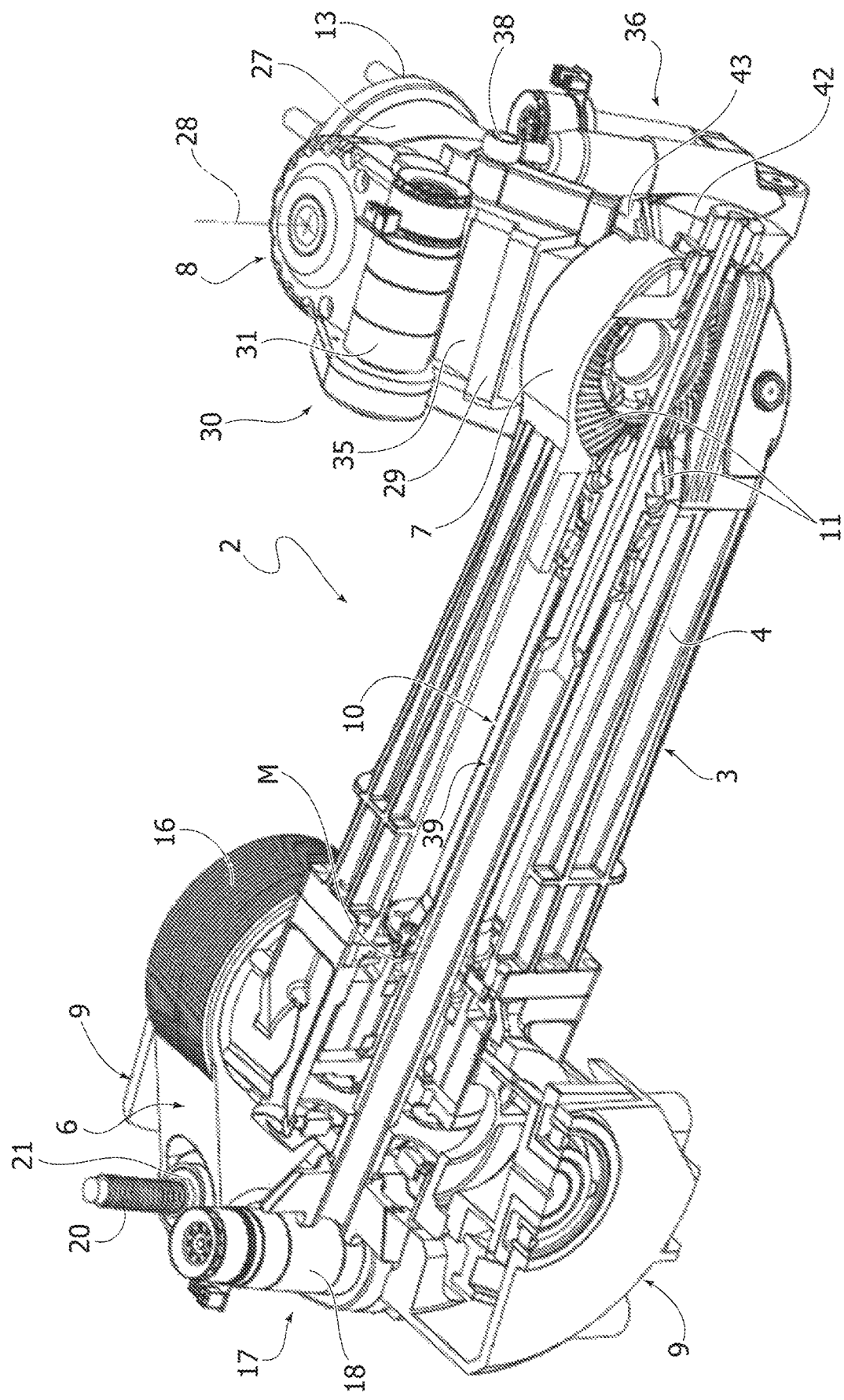
Figure 8:
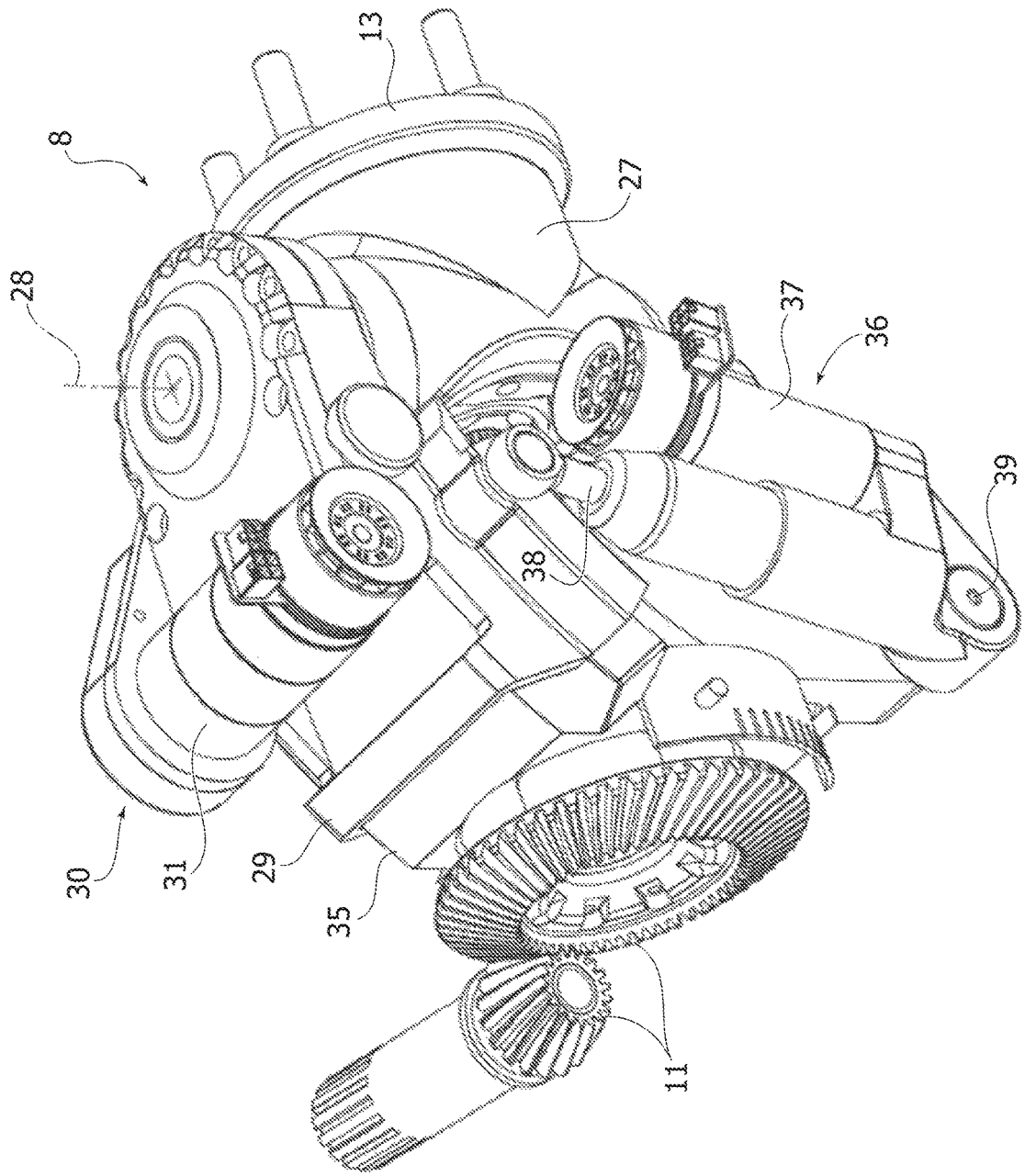
Figure 9:
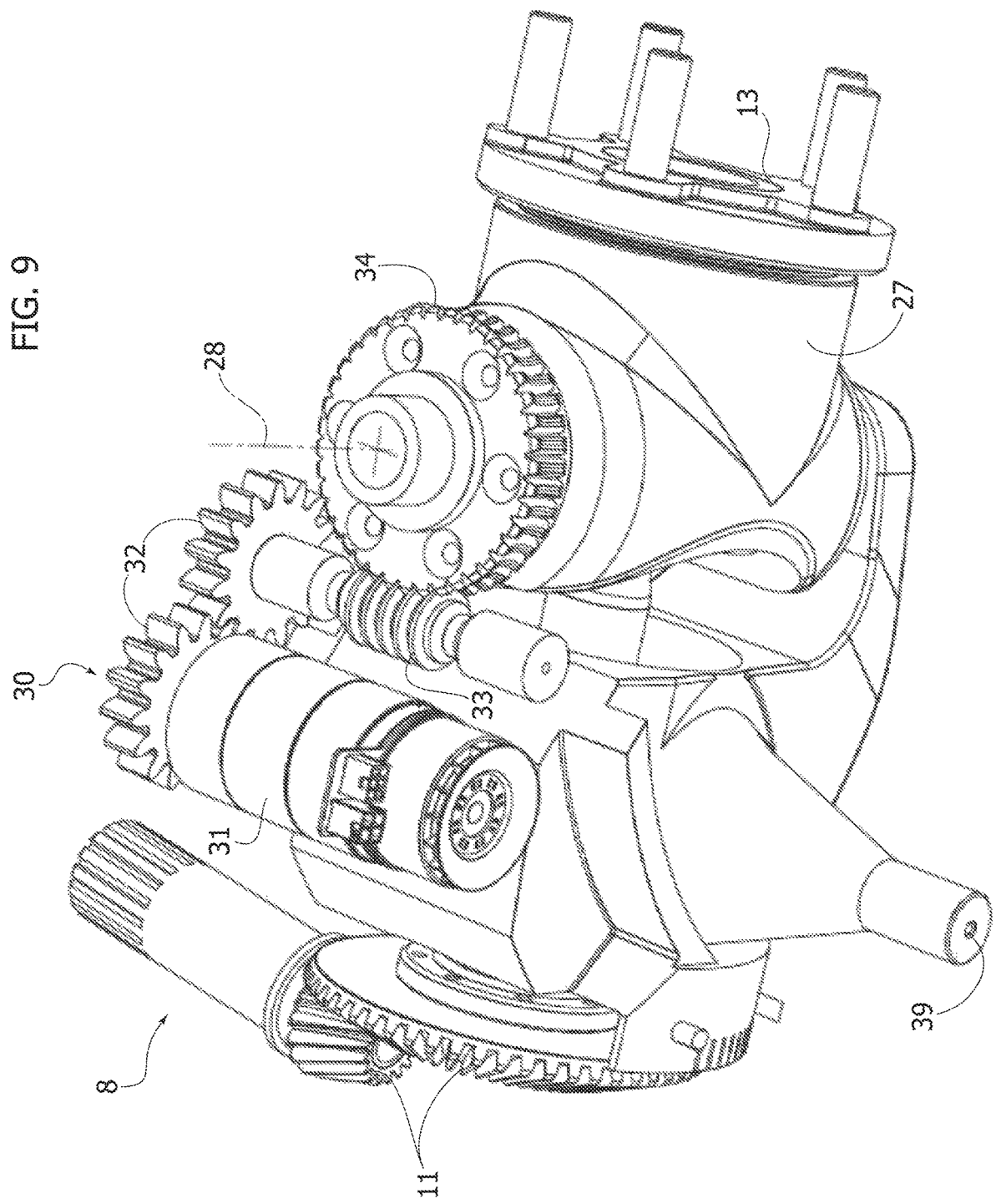
Figure 10:
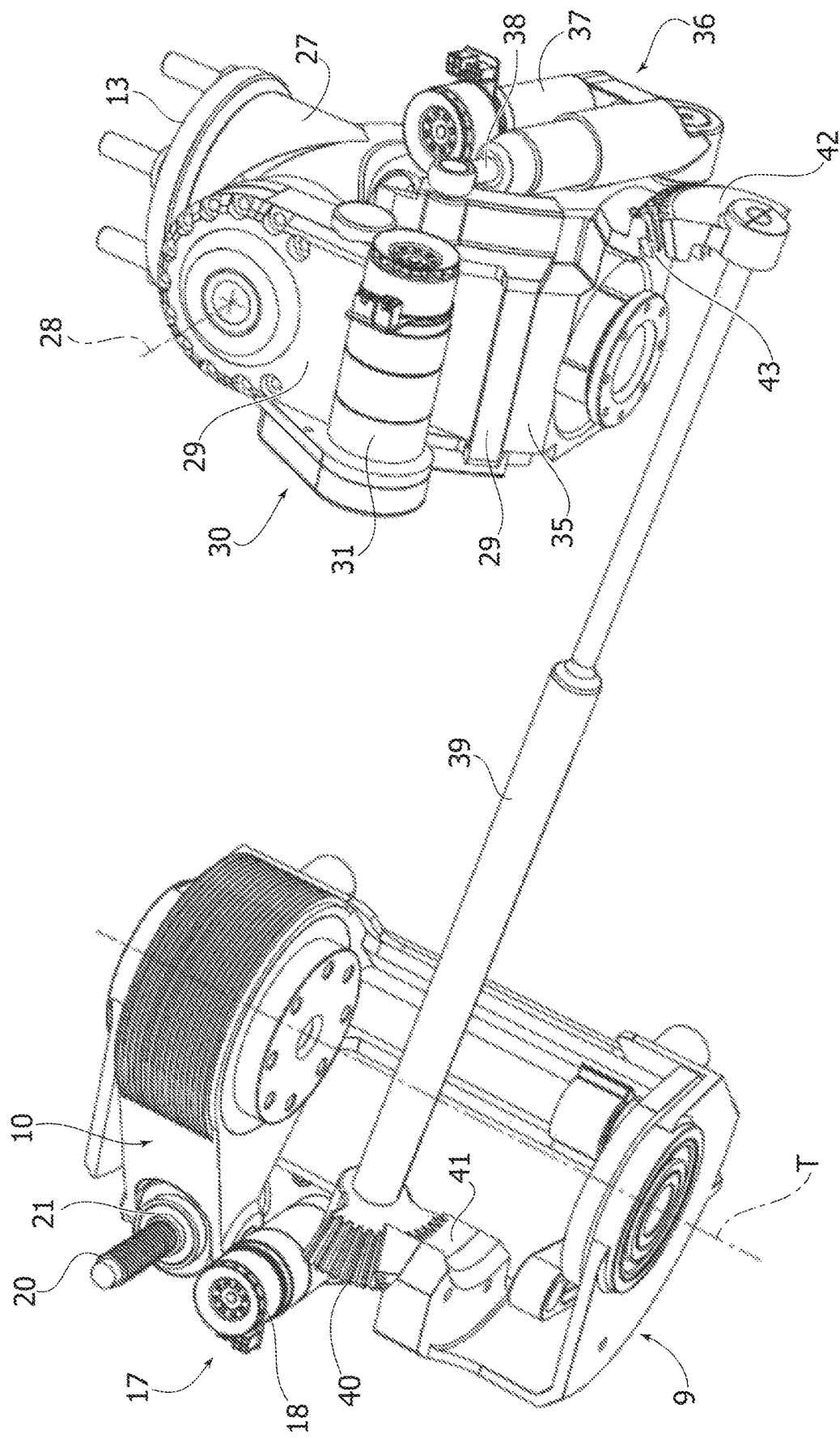
Figure 11:
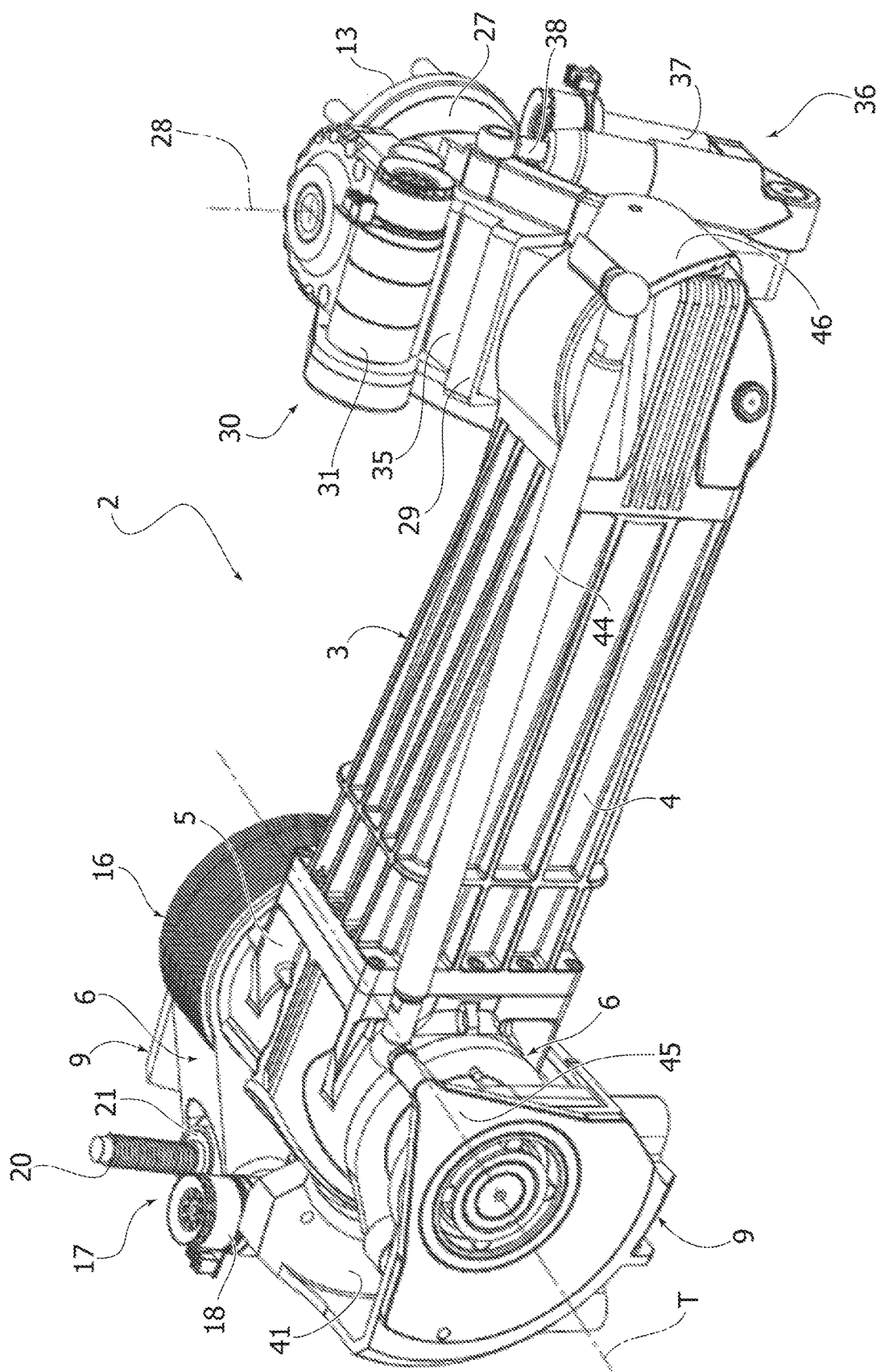
Figure 12:
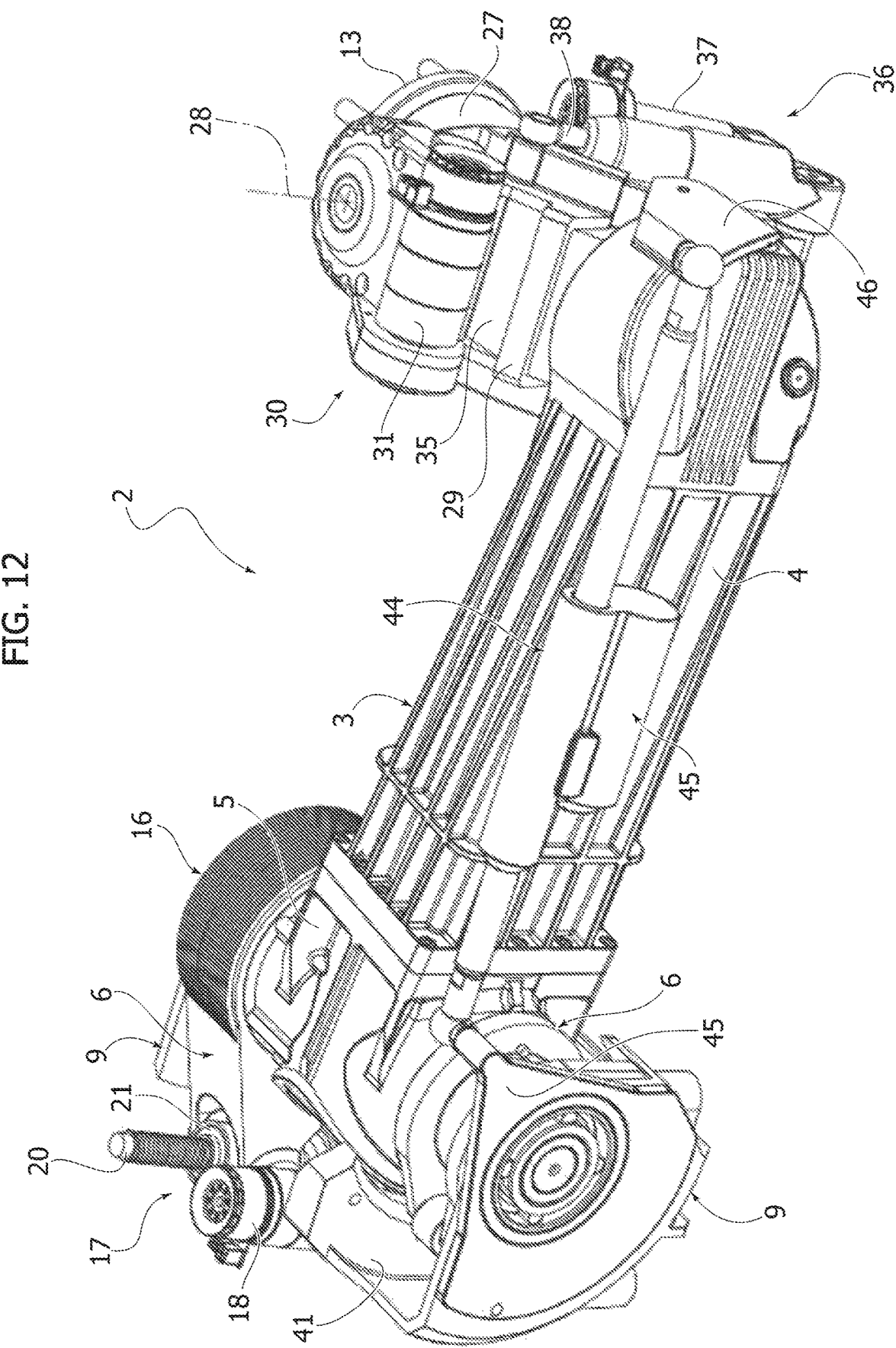

Further characteristics and advantages of the invention will become apparent from the description that follows with reference to the attached drawings, provided purely by way of non-limiting example, wherein:

FIG. 1 is a perspective view of a preferred embodiment of an articulated leg unit according to the present invention, FIG. 2 is a perspective view of the unit of FIG. 1, wherein some parts have been removed, to show the wheel propulsion system, FIG. 2A is a partially cross-sectioned perspective view of the unit of FIG. 1, FIG. 3 is another perspective view of the unit of FIG. 1, wherein some parts have also been removed to show the inner structure of the unit adjacent to its articulation axis, FIG. 4 is an additional perspective view of the unit of FIG. 1, with parts removed, FIG. 5 illustrates the same perspective view of FIG. 3 with some further parts removed, FIG. 6 is a further perspective view of the structure visible in FIG. 5, FIG. 7 is a partially cross-sectioned perspective view of the unit of FIG. 1, FIG. 8 is a perspective view on an enlarged scale of the hub-bearing assembly forming part of the unit of FIG. 1, FIG. 9 is an additional perspective view of the hub-bearing assembly, FIG. 10 is a perspective view of the entire articulated leg unit where many parts have been removed to show the caster control device, according to a first solution, FIG. 11 is an additional perspective view of the unit of FIG. 1 in the case of a second embodiment of the caster control device, FIG. 12 illustrates a variant of FIG. 11.

Figure 13:
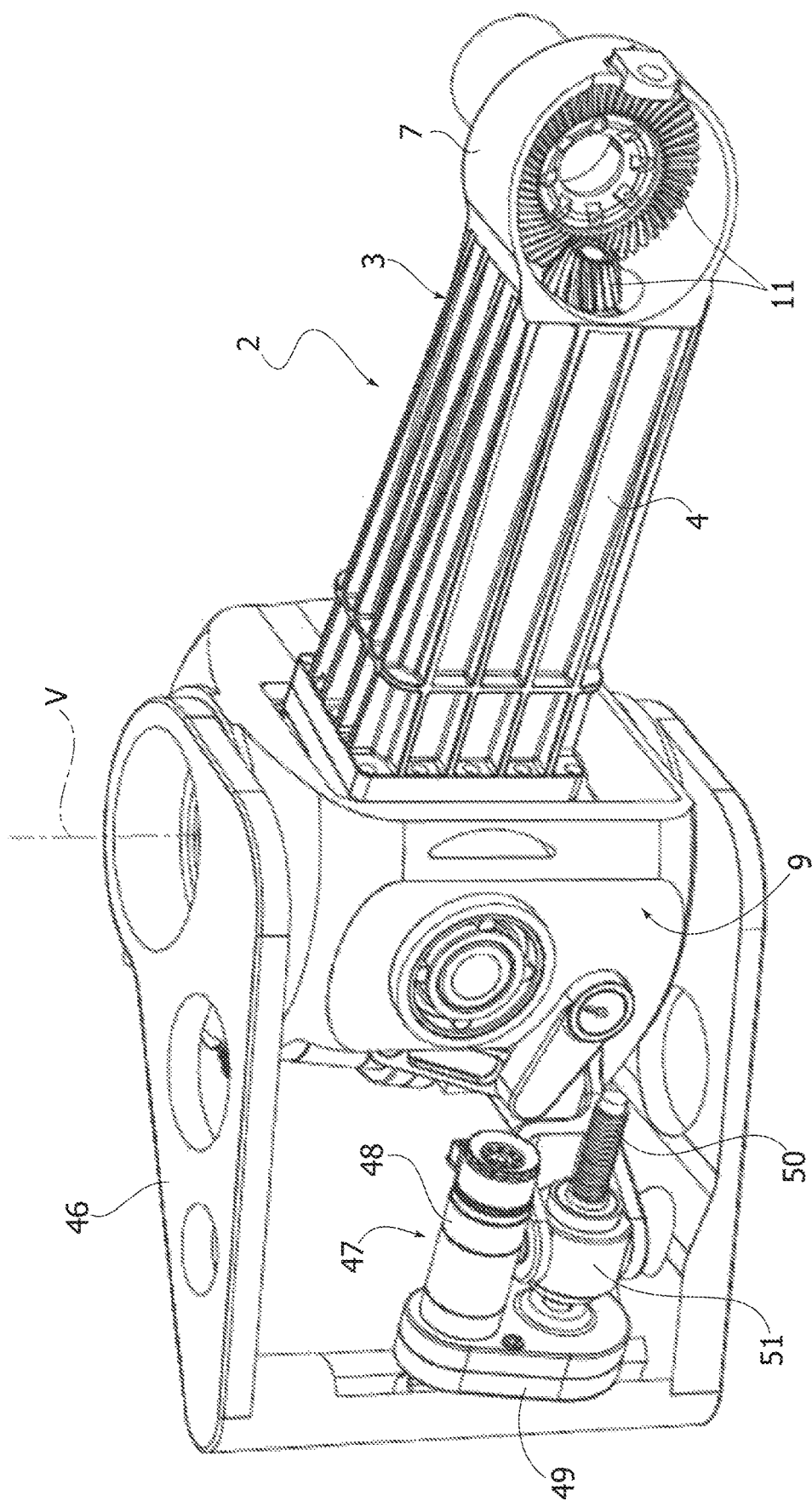
Figure 14:
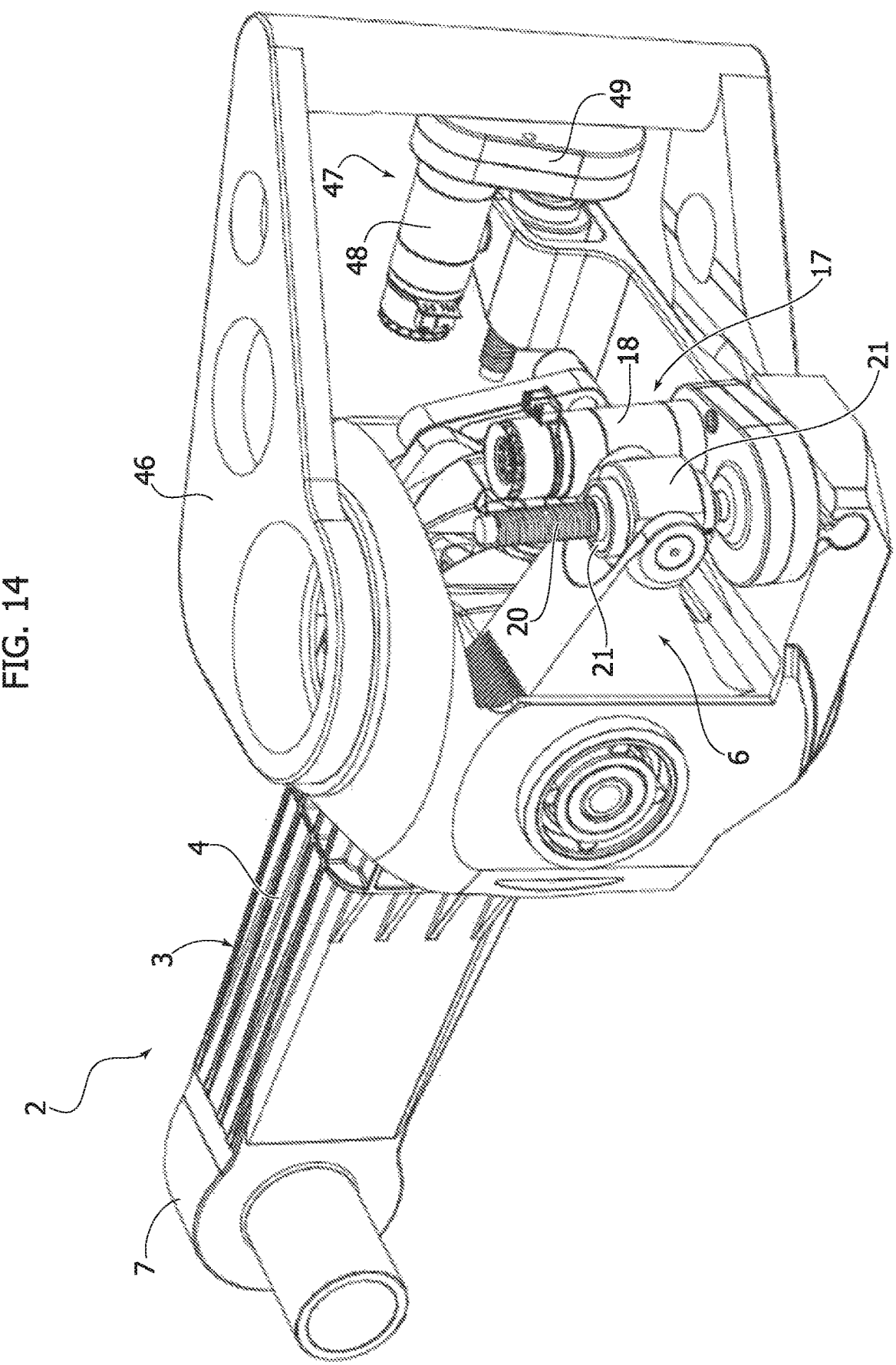
Figure 15:
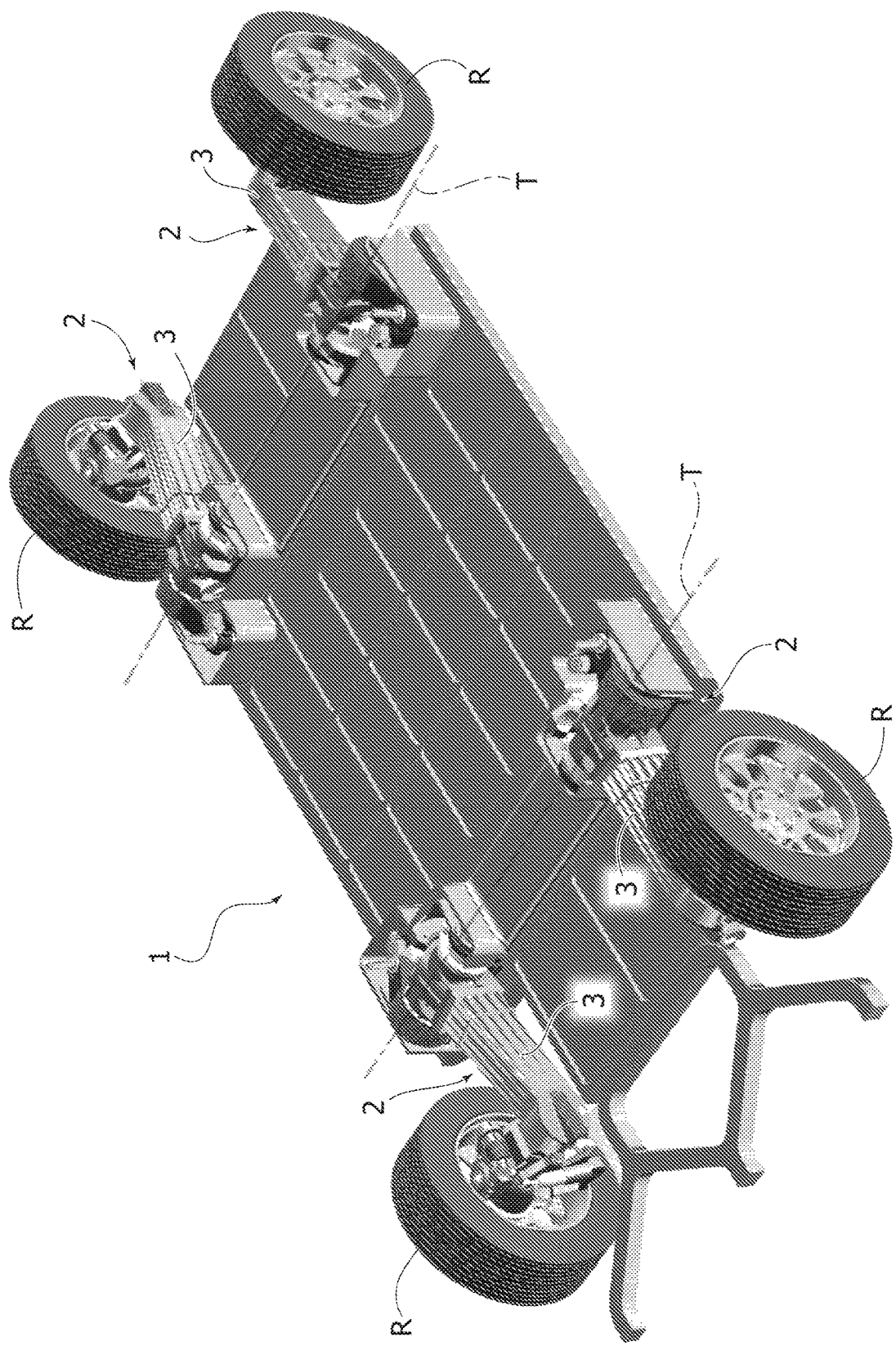
Figure 17:
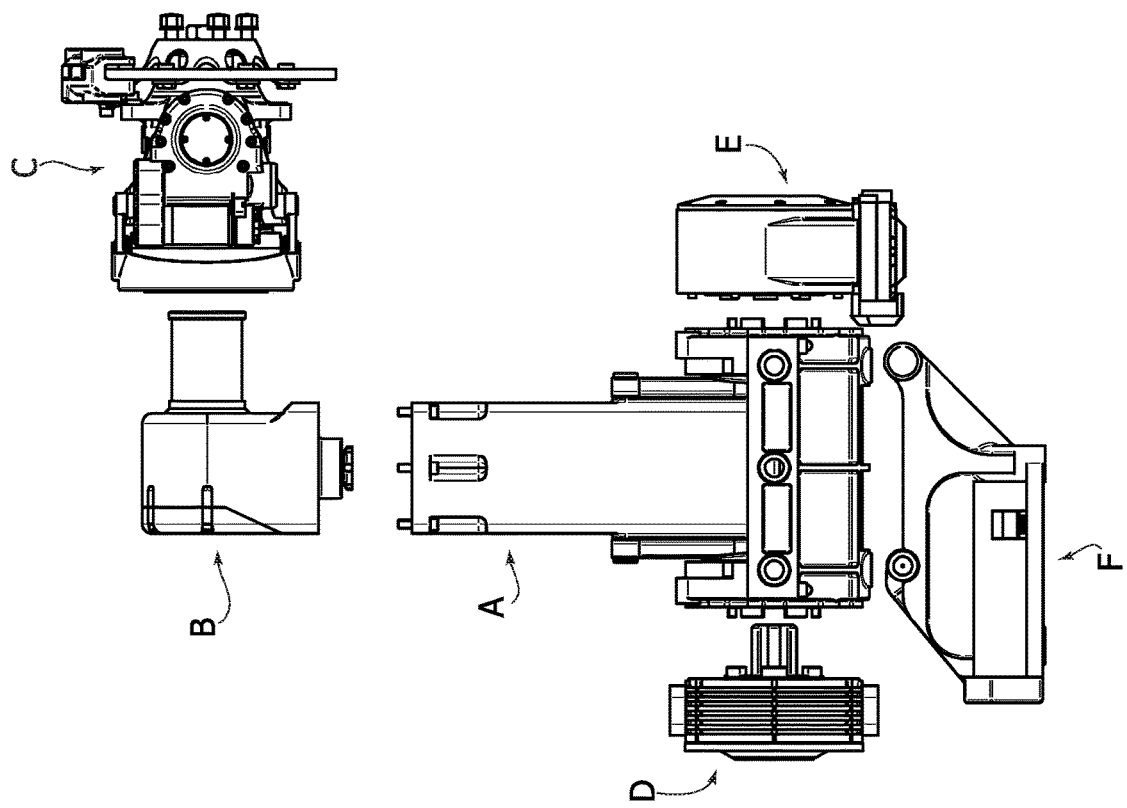
Figure 16:
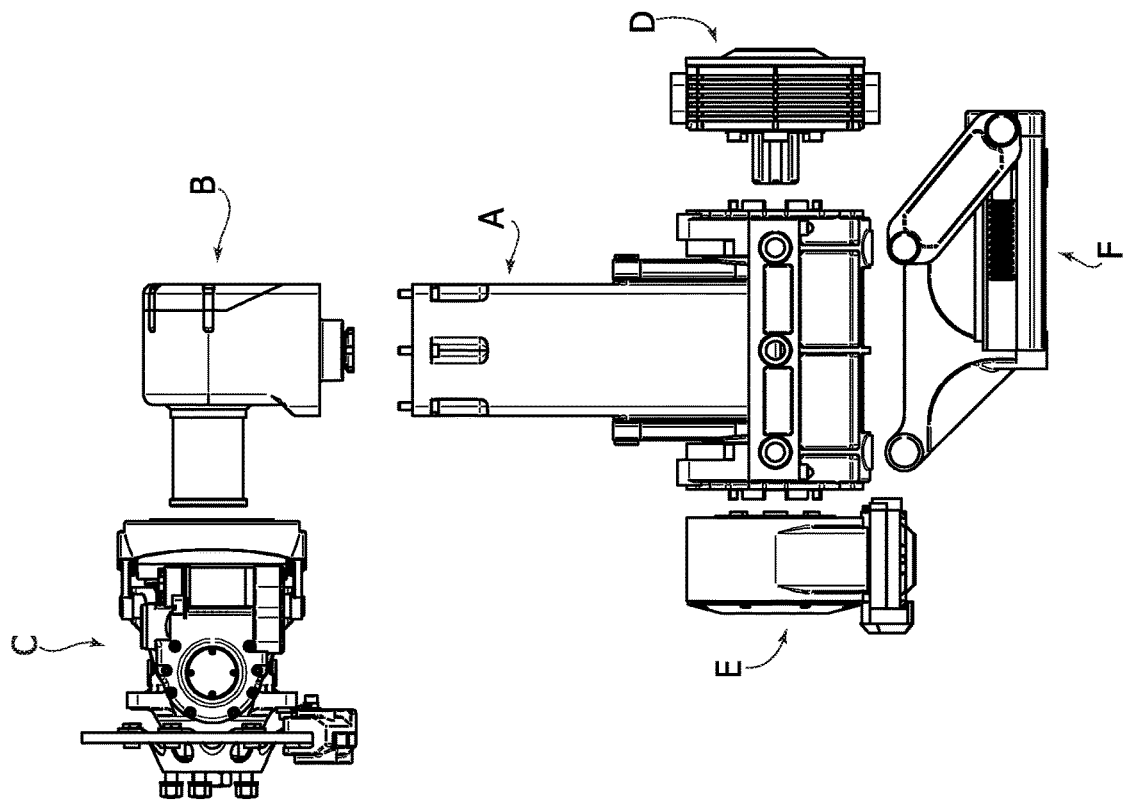

FIGS. 13, 14 are two further perspective views that refer to a variant wherein the base support of the articulated leg is—in turn—mounted pivoting around a vertical axis on a support rigidly connected to the vehicle structure, FIG. 15 is a perspective view of an embodiment example of a frame of an electric car with four steering and drive wheels, each carried by an articulated leg unit according to the present invention, and FIGS. 16, 17 are two exploded perspective views of a constructive variant of the articulated leg according to the invention, wherein the leg is made up of modules that can be assembled in the two different ways illustrated in these figures, to create, respectively, with the same components, a right leg or a left leg, of the vehicle.

With reference initially to FIG. 15, the reference number 1 indicates—in its entirety—the frame of an electric motor-vehicle with four steering and drive wheels. Each of the four wheels R is carried by an articulated leg unit 2 according to the present invention including a leg structure 3 mounted articulated around a transverse axis T on the chassis 1 of the vehicle.

FIGS. 1-14 refer to preferred embodiments of each articulated leg unit 2.

In the illustrated example, the leg structure 3 includes a metal casing 4 connected to a first end portion 5, also in the form of a hollow metal casing, which is mounted pivoting around the articulation axis T on a main support 6. At the opposite end, the casing 4 defines a second end portion 7, which carries a hub-bearing assembly 8.

The main support 6 around which the first end portion 5 of the leg structure is pivotally mounted is—in turn—rotatably mounted about the transverse axis T on a base support 9, which is rigidly connected to the vehicle structure.

With reference to FIG. 2, the propulsion system of the wheel carried by the leg 2 is arranged inside the casing 4 forming part of the leg structure 3.

According to the preferred embodiment, this propulsion system includes an electric motor M whose body is rigidly mounted inside the box with the axis of the motor oriented in the longitudinal direction of the leg 2. The shaft of the electric motor M is connected to a first shaft 10, which drives—by means of a pair of bevel gears 11—a second shaft 12 protruding from the end portion 7 of the leg 2 and connected to the hub 13 of the wheel by means of a first homokinetic joint 14 (FIG. 2A) and, in the case of the illustrated example, by means of a further ball joint 15. With reference to FIGS. 3-5, the end portion 5 of the leg structure is rotatably supported around the transverse axis T, on two opposite sides, by the main support 6. On one side of the end portion 5 of the leg there is a rotational damper 16, of any type known per se, operationally interposed between the main support 6 and the leg structure 3.

Again with particular reference to FIGS. 3, 5, between the base support 9, which is rigidly connected to the vehicle structure, and the main support 6, on which the leg 2 is rotatably mounted, an actuator device indicated—in its entirety—by reference 17 is interposed. In the illustrated example, the actuator device 17 comprises an electric motor 18 which controls, by means of a gear transmission (the casing of which is indicated by 19 in FIG. 4), a screw 20 engaged within a nut screw 21 connected in an articulated manner to the main support 6.

Thanks to the arrangement described above, activation of the actuator device 17 allows the position of the main support 6 to be adjusted around the articulation axis T with respect to the base support 9. The rotation imparted by the actuator device 17 to the main support 6 around the transverse axis T is transmitted by the rotational damper 16 (which in this case simply acts as a transmission element) to the end portion 5 of the leg structure 2, so that the whole leg varies its position around the articulation axis T with respect to the vehicle. Simultaneous adjustment of the actuator devices 17 associated with the different legs 2 of the vehicle allows, therefore, the height of the vehicle from the ground to be adjusted.

At the same time, for a certain adjustment of the height of the vehicle from the ground, while the vehicle is running, the leg 2 can pivot around the articulation axis T with respect to the main support 6, against the damping action of the damper 16, and against the action of a spring element 22 (FIG. 6), which—in the illustrated example—consists of a torsion bar, having one end (the left end in FIG. 6) anchored to the support 6, and the opposite end carrying a crank 23 connected by means of a rod 24 to an additional crank 25, which is rotatable around the axis T together with the structure 3 of the leg 2 (FIG. 6).

With reference now to FIGS. 2A and 9, the wheel hub 13 is rotatably mounted by means of bearings 26 within a hub-bearing support 27. This support is rotatably mounted about a steering axis 28 both to allow the steering of the wheel to be controlled, and to allow adjustment of the "toe" angle of the wheel.

The hub-bearing support 27 is rotatably mounted around the steering wheel axis 28 on an auxiliary camber adjustment support 29. The structure of the auxiliary camber adjustment support 29 supports an actuator device 30 for actuating the steering rotation of the support 27 around the axis 28 (or for adjusting the toe angle).

In the illustrated example (FIG. 9) the actuator device 30 comprises an electric motor 31 which drives—by means of a pair of gears 32—a worm screw 33 meshing with a helical wheel 34, which is connected in rotation with the support 27.

The auxiliary camber adjustment support is—in turn—pivotally mounted around a camber adjustment axis above an additional auxiliary caster adjustment support 35.

With reference to FIG. 2A, the auxiliary support 35 for caster adjustment is rotatably supported around the axis A of the second shaft 12 protruding from the leg structure and connected by means of the joints 14, to the wheel hub. As also visible in FIG. 2A, the structure of the auxiliary support 35 for adjusting the caster carries an actuator device 36 for adjusting the position of the auxiliary support 29 for adjusting the camber. As can be seen, for example, in FIG. 8, the auxiliary support 29 for adjusting the camber is guided by means of an arched prismatic guide on the body of the auxiliary support 35 so as to be orientable around a camber adjustment axis, which is substantially parallel to the longitudinal direction of the leg. With reference again to FIGS. 2A, 8, the actuator device 36 comprises an electric motor 37, which drives a screw rod 38 by means of a gear transmission. Still with reference to FIG. 8, the actuator device assembly 36 is mounted in an articulated manner around an axis 39 on the structure of the support 35, and has the distal end of the screw rod 38 connected in an articulated manner to the auxiliary support 29. Therefore, for a given position of the auxiliary support 35, activation of the actuator device 36 allows adjustment of the position of the auxiliary support 29 around the camber adjustment axis, so that the camber angle defined by the steering axis 28 is varied.

As is evident from the above description, the adjustment position of the hub-bearing support 27 around the steering axis 28 is controlled by the actuator device 30, while the adjustment of the camber angle, determined by the position of the auxiliary support 29, is controlled by the actuator device 36.

In the case of the example illustrated here, adjustment of the caster angle is, instead, obtained passively by associating a passive control device with the auxiliary support 35 for adjusting the caster. In a first solution (FIG. 10), this device includes a gear transmission including a shaft 39 (FIG. 10) rotatably mounted inside the hollow structure of the shaft 10 driven by the electric motor M (FIGS. 2, 2A). With reference to FIG. 10, one end of the shaft 39 carries a bevel gear sector 40, which meshes with a bevel gear sector 41 carried by the base support 9, which is rigidly connected to the vehicle structure. The opposite end of the shaft 39 carries a bevel gear sector 42, which meshes with a bevel gear sector 43 carried by the auxiliary support 35 for adjusting the caster.

When the leg structure 2 pivots around the axis T with respect to the vehicle structure, the sector of the bevel gear wheel 40 (which is arranged beyond the transverse articulation axis T) rolls on the sector of the bevel gear 41, which is kept fixed by impressing a rotation of the shaft 39 about its axis. Rotation of the shaft 39 is transmitted from the bevel gear sector 42 to the auxiliary caster adjustment support 35. The aforesaid gear transmission is configured in such a way that as the position of the leg 2 varies around the articulation axis T, the auxiliary support 35 is rotated in such a way as to keep the steering axis 28 parallel to itself.

FIG. 11 shows a variant of the solution of FIG. 10, wherein instead of the gear transmission described above, a pantograph system including a rod 44 external to the casing 4 of the leg 2 is used as the caster angle control device 2, having one end articulated to a bracket 45 of the base support 9 in a position spaced apart from the transverse axis T, and the opposite end articulated to a bracket 46 rigidly connected to the auxiliary support 35 for adjusting the caster angle. Also in this case, a variation of the position of the leg 2 around the transverse axis T entails that the articulated rod 44 forces the auxiliary support 35 to rotate around the axis A visible in FIG. 2A. Also in this case, the configuration of the pantograph system may be such as to ensure that when the position of the leg 2 varies around the articulation axis T, the steering axis 28 of the wheel remains parallel to itself. FIG. 12 shows a further variant of FIG. 11, wherein the rod 44 is an adjustable length rod, incorporating an actuator device 45 including an electric motor and a transmission that connects the electric motor to a screw-nut system.

FIGS. 13, 14 refer to an another advanced embodiment, wherein the base support 9, instead of being rigidly connected to the vehicle structure, is rotatably mounted around a vertical axis V (with reference to the mounted condition on the vehicle) on a support 46 rigidly connected to the vehicle structure. In the case of this embodiment, an actuator device 47 is provided, including an electric motor 48 which drives—by means of a gear transmission (the box of which is indicated by 49 in FIG. 13)—a screw 50 engaged within a nut screw 51 connected in an articulated manner to the base support structure 9. Activation of the actuator device 47 commands a rotation of the base support 9 around the vertical axis V, and, together with the base support 9, a rotation of the entire articulated leg 2 around the vertical axis V. By means of this adjustment, carried out simultaneously on the legs placed on the two sides of the vehicle, it is possible to obtain an adjustment of the wheel track of the vehicle, to adapt the vehicle, for example, to travel on rough terrain which may lead to greater lateral instability of the vehicle.

In a preferred embodiment, the various elements making up the unit according to the invention are associated with surface-mounted mechanical deformation sensors (for example, of the FSS-SMT type marketed by Honeywell) for continuous structural self-diagnostics on the system, which gives a warning in the case of off-plate stresses.

FIGS. 16, 17 are two exploded perspective views of a constructive variant of the articulated leg according to the invention, wherein the leg is made up of modules A-F, which are configured in such a way so that they can be assembled in the two different ways illustrated in these figures, to produce, with the same components, a right leg or a left leg, respectively, of the vehicle. In particular, module A indicates the main body of the leg, containing the electric traction motor, module B indicates the bevel gear unit for connecting the shaft of the electric motor to the wheel hub, module C indicates the wheel-hub-bearing assembly, including the camber adjustment function and the steering/toe adjustment function, module D indicates the damper assembly for the damping of the pivoting of the leg, module E indicates the assembly for adjusting the vehicle height, and module F indicates the unit for adjusting the wheel track.

By assembling these same components in the two ways illustrated in FIGS. 16, 17, it is possible to obtain a right leg or a left leg, front or rear, whereby all the articulated legs of the vehicle are obtained starting from the same components, which simplifies the production of the components and reduces the costs and space required for their storage.

Of course, without prejudice to the principle of the invention, the details of construction and the embodiments may vary widely with respect to those described and illustrated purely by way of example, without departing from the scope of the present invention, as defined by the attached claims.

The invention claimed is:

1. A vehicle, comprising a vehicle structure and a plurality of wheels carried by respective legs articulated to the vehicle structure, wherein one or more of said articulated legs comprises a leg structure carrying an electric motor for driving a respective wheel, and a mechanical transmission operatively interposed between a shaft of said electric motor and a hub of said wheel, wherein said leg structure is pivotally mounted on a main support around an axis, which is transversal with respect to a longitudinal direction of the vehicle, wherein a spring element and a damper member are operatively interposed between said main support and the leg structure,
- wherein said main support is—in turn—rotatably mounted about said transverse axis on a base support, which is connected to the structure of the vehicle,
- wherein an actuator device is operatively interposed between said main support and said base support to adjust the position of the main support around said transverse axis with respect to the base support, the rotation of the main support being transmitted to the leg structure by said spring element and/or by said damper member, which are interposed between the main support and the leg structure,
- in such a way that the activation of said actuator device adjusts the position of a leg of the legs with respect to the vehicle, and consequently the height of the vehicle from the ground, while for a given adjustment of the height of the vehicle, during running of the vehicle, the leg structure pivots around said transverse axis with respect to said main support, against the action of said spring element and said damper member,
  - said leg structure comprising a support casing within which said electric motor is arranged, and which includes:
  - a first end portion rotatably supported by said main support around said transverse axis, and
  - a second end portion that carries a wheel support unit, and
  - wherein said wheel support unit includes:
  - a hub-bearing support, rotatably mounted around a wheel steering axis on an auxiliary support for camber adjustment, which is—in turn—pivotally carried by the second end portion of the leg structure around a camber adjustment axis, and
  - a camber adjustment actuator device carried, directly or indirectly, by said second end portion of the leg structure.

2. A vehicle according to claim 1, wherein the camber adjustment support is mounted so that it can be oriented around a camber adjustment axis on an auxiliary support for caster adjustment, which is pivotably carried by said second end portion of the leg structure in an orientable manner around a caster adjustment axis, said camber adjustment actuator device being carried by said caster adjustment support, and
in that the auxiliary caster adjustment support is connected to a caster control device configured to automatically adjust the position of the auxiliary caster adjustment support when the position of the leg around the transverse axis varies.

3. A vehicle according to claim 2, wherein the caster control device is a gear transmission operationally interposed between a gear sector carried by the base support and a gear sector carried by the auxiliary caster adjustment support.

4. A vehicle according to claim 2, wherein said caster control device comprises a pantograph system operationally interposed between the base support and the auxiliary caster adjustment support.

5. A vehicle according to claim 1, wherein said auxiliary camber adjustment support supports an actuator device for controlling a rotation of the hub-bearing support around the wheel steering axis.

6. A vehicle according to claim 1, wherein the electric motor is arranged with its axis parallel to the longitudinal direction of the leg and has a motor shaft connected to the wheel hub by means of a transmission including:
- a first shaft driven by the electric motor and rotatably mounted inside the leg structure around an axis arranged in the longitudinal direction of the leg structure,
- a pair of bevel gears, which transmit rotation of the first shaft to a second shaft protruding from the second end portion of the leg structure, and
- at least one homokinetic joint to connect the second shaft to the wheel hub.

7. A vehicle according to claim 1, wherein said damper member is a rotational damper arranged, with its axis coincident with said transverse axis, on one side of the leg structure and operatively interposed between the leg and the main support.

8. A vehicle according to claim 1, wherein said spring member is a torsion bar arranged around an axis parallel to, and spaced apart from said transverse axis, said torsion bar having one end anchored to the base support and the opposite end carrying a crank, which is connected by means of an articulated rod to an additional crank rotating around said transverse axis together with the structure of the leg.

9. A vehicle according to claim 1, wherein the base support is—in turn—rotatably mounted on the vehicle structure around a vertical axis and that an actuator device is associated therewith for adjusting the position of the base support, and consequently of the entire leg, around said vertical axis, so as to adjust the wheel track of the vehicle.

10. A vehicle according to claim 1, wherein each actuator device is an electrically-operated actuator device, and the vehicle comprises an electronic controller configured and programmed to control said actuator devices on the basis of signals coming from one or more sensors.

11. A vehicle according to claim 1, further comprising one or more sensors suitable for detecting the profile of the ground in front of the vehicle while the vehicle is running, said vehicle being provided with an electronic controller configured to receive output signals from said sensors and for controlling the actuator devices that control the height of the vehicle from the ground on the basis of said signals.

12. An articulated leg system for a vehicle comprising:
- a leg structure carving an electric motor for driving a respective wheel, and a mechanical transmission operatively interposed between a shaft of said electric motor and a hub of said wheel,
- wherein said leg structure is pivotally mounted on a main support around an axis, which is transversal with respect to a longitudinal direction of the vehicle,
- wherein a spring element and a damper member are operatively interposed between said main support and the leg structure,
- wherein said main support is—in turn—rotatably mounted about said transverse axis on a base support, which is connected to the structure of the vehicle,
- wherein an actuator device is operatively interposed between said main support and said base support to adjust the position of the main support around said transverse axis with respect to the base support, the rotation of the main support being transmitted to the leg structure by said spring element and/or by said damper member, which are interposed between the main support and the leu structure, in such a wav that the activation of said actuator device adjusts the position of a leu of the levs with respect to the vehicle, and consequently the height of the vehicle from the ground, while for a given adjustment of the height of the vehicle, during ruining of the vehicle, the leg structure pivots around said transverse axis with respect to said main support, against the action of said spring element and said damper member, said leg structure comprising a support casing within which said electric motor is arranged, and which includes:

a first end portion rotatably supported by said main support around said transverse axis, and a second end portion that carries a wheel support unit, and wherein said wheel support unit includes:

a hub-bearing support, rotatably mounted around a wheel steering axis on an auxiliary support for camber adjustment, which is—in turn—pivotally carried by the second end portion of the leg structure around a camber adjustment axis, and a camber adjustment actuator device carried, directly or indirectly, by said second end portion of the leg structure.

* * * * *